No. 643,020.  
W. WEBBER.  
WHIFFLETREE HOOK.  
(Application filed June 19, 1899.)  
Patented Feb. 6, 1900.
(No Model.)
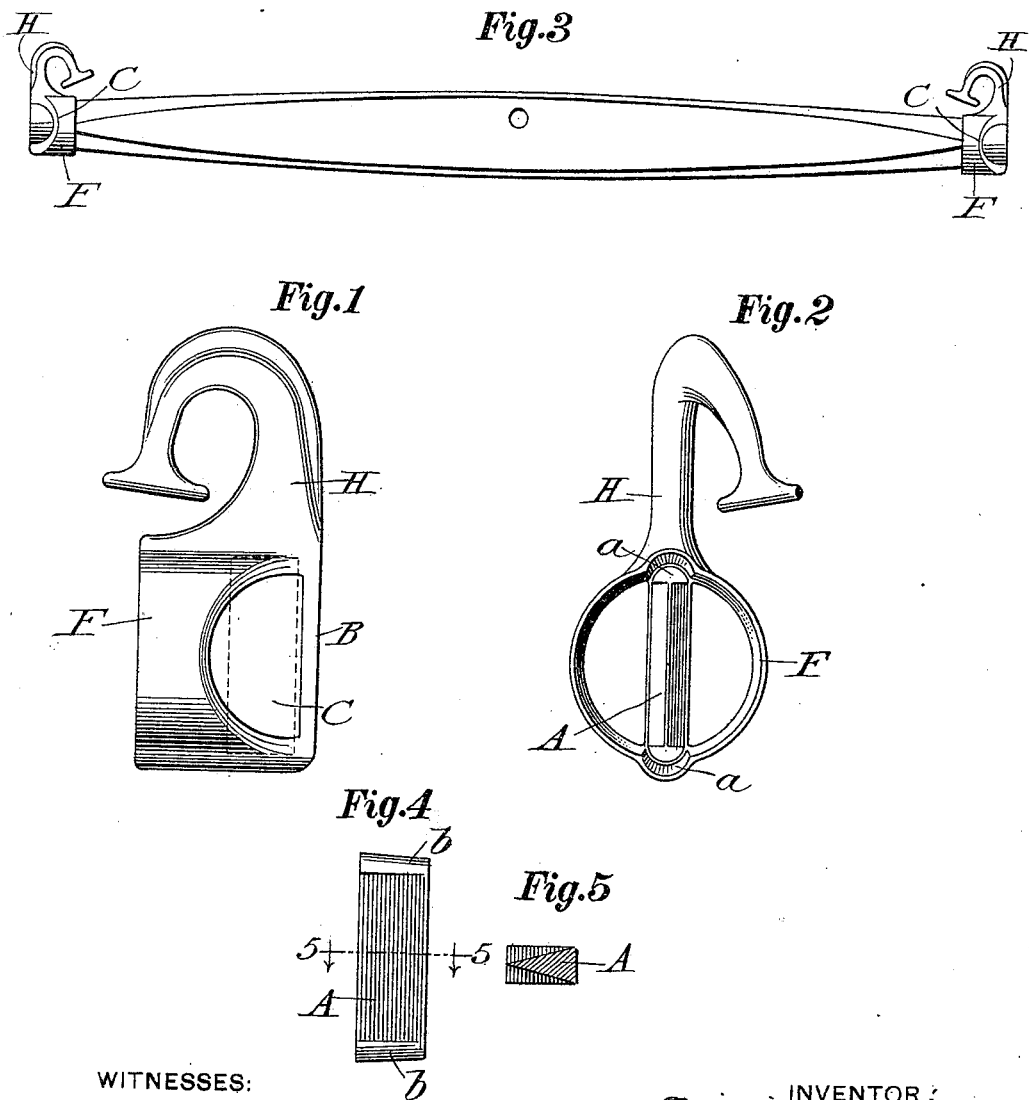
WITNESSES:
INVENTOR:
William Webber
BY
Jennie V. Goldsborough
ATTORNEYS.

UNITED STATES PATENT OFFICE.

WILLIAM WEBBER, OF CHICAGO, ILLINOIS.

WHIFFLETREE-HOOK.

SPECIFICATION forming part of Letters Patent No. 643,020, dated February 6, 1900.

Application filed June 19, 1899. Serial No. 721,071. (No model.)

*To all whom it may concern:*

Be it known that I, WILLIAM WEBBER, a citizen of the United States, residing in Chicago, in the county of Cook and State of Illinois, have invented certain new and useful Improvements in Whiffletree-Hooks; and I do hereby declare the following to be a full, clear, and exact description of the invention, such as will enable others skilled in the art to which it appertains to make and use the same.

The invention relates to whiffletrees, and has for its object to provide an improved trace-hook therefor and a novel manner of securing the same to and upon the ends of the trees.

Whiffletree-hooks of the type herein illustrated and described are not new, and although the type is a convenient and efficient one a difficulty has been encountered in the practical application of such hooks, due, primarily, to the shrinking of the ends of the trees and the loosening of the hooks. As heretofore constructed these hooks have either been closed at their outer ends and provided with inwardly-extending prongs or spurs or have had their outer ends left open except for a cross-brace or strengthening-bar extending diametrically across the same and formed into a knife-edge along its inner edge to form the wedge. In either case the prongs or wedges have been integral with the hooks, and consequently when the ends of the trees shrink the wedges being integral with the hooks move with them and allow the whole to become loose. In the present invention this difficulty is entirely avoided by discarding altogether the knife-edged construction of the strengthening-bar and the integral wedge and using a wedge that is separate from and forms no part of the hook itself. The strengthening-bar is preferably, though not necessarily, retained and when used instead of being made into a wedge has no wedging or end-splitting function at all, but is simply employed as an abutment against and upon which the separate wedge is seated when the hook is driven onto the tree and by means of which the wedge is forced into the tree end ahead of the bar.

The invention is illustrated in the accompanying drawings, wherein—

Figure 1 is a side view of the hook, the position of the wedge being indicated in dotted line. Fig. 2 is a view looking into the inner end of the hook, the wedge being in place. Fig. 3 is an elevation of a whiffletree with the hooks in position, and Figs. 4 and 5 are side and cross-sectional views of the wedge dissociated from the hook.

Referring to the views, F denotes the ferrule or ring of the hook, H the hook proper, and B the strengthening-bar. Except as hereinbefore indicated and as will be more fully described later on no novelty is claimed for these features of the hook, and they may be shaped and constructed as taste or the requirements of particular uses may suggest.

As shown in Figs. 1 and 2, the cross-bar B is a plain flat web extending diametrically across the otherwise open end of the ferrule F, the sides of which are preferably cut away, as shown at C, Fig. 2, to allow the split halves of the tree end to bulge outwardly. At diametrically opposite points and preferably in line with the ends of the bar B the interior of the ferrule or ring F is longitudinally recessed or grooved, as shown at $a$ $a$ in Fig. 2, to form guides and and seats for the wedge which is slipped into the inner end of the ferrule before it is driven onto the tree end.

The construction of the wedge A is fully illustrated in Figs. 4 and 5. Its ends are preferably rounded, as denoted at $b$, so that they slip easily into the recesses in the ferrule. It may be of any preferred width and thickness; but in order to make a neat finish it is usually made of a thickness just equal to the width of the strengthening-bar, so that the latter conceals it in the finished article. The length of the wedge corresponds to the internal diameter of the ferrule and, as shown in Figs. 4 and 5, the ends $b$ project beyond its sharpened edge.

In applying these hooks to whiffletrees the wedges are first slipped into the ferrules. The hooks are then driven on in the usual way and the wedges are forced into the wood by the strengthening-bar and split the ends of the tree until the wood is flush with the outside of the hook, the wedges being entirely embedded and concealed in the wood.

The effect of making the wedges separate from the hooks is that, although the wood may shrink and the ferrules be wrenched by pulling on the traces, there is no tendency to loosen them, and they remain precisely where driven, and thus hold the split ends of the wood bulged out, so that it is impossible for the hooks to be loosened or pulled off, and any liability there may be for the hooks to loosen is not imparted to the wedges, as in the case of the old constructions.

The entering of the ends of the wedge in the recesses of the ferrule not only holds the wedge in position while the hook is being applied, but holds the wedge so as to prevent the hook from turning on the tree end after it has been applied, and the outer ends of the recesses may furnish seats or abutments for the wedge where the strengthening-bar is not used.

Having thus described my invention, what I claim is—

1. In a whiffletree-hook, the combination with the ring or ferrule, of a separate wedge, and a seat in the ferrule adapted to receive the wedge preliminarily to applying the ferrule to the tree, whereby the wedge is forced into the wood by driving the ferrule onto the tree end.

2. In a whiffletree-hook, the combination with a ring or ferrule having a strengthening-bar extending diametrically across its outer end, of a wedge separate from the hook, and a seat on the bar within the ferrule adapted to receive the wedge, whereby the latter is forced into the wood when the hook is driven onto the tree end.

3. In a whiffletree-hook, the combination of the ring or ferrule F, the strengthening cross-bar B, and the separate wedge A, the ends of the latter being adapted to engage the ferrule so as to aline the wedge with the cross-bar.

4. In a whiffletree-hook, the combination with the ring or ferrule F, the strengthening cross-bar B, and the separate wedge A, the ferrule having grooves or recesses in line with the ends of the bar, and the wedge having its ends adapted to said grooves or recesses.

In testimony whereof I affix my signature in presence of two witnesses.

WILLIAM WEBBER.

Witnesses:
   ALFRED E. CHADWICK,
   CHAS. W. ALLEN.